United States Patent [19]

Warneke

[11] 3,827,178
[45] Aug. 6, 1974

[54] DEVICE FOR ATTACHMENT TO THE WHEEL OF A BICYCLE

[76] Inventor: Richard J. Warneke, 915 W. Miner St., Arlington Heights, Ill. 60005

[22] Filed: Nov. 21, 1973

[21] Appl. No.: 417,952

[52] U.S. Cl............ 46/191, 46/175 R, 301/37 CM, 116/56
[51] Int. Cl.............................................. A63h 5/00
[58] Field of Search......... 301/37 CM, 37 C, 37 SA; 46/175 R, 177, 189, 191; 116/56; 350/99

[56] References Cited
UNITED STATES PATENTS

| | | | |
|---|---|---|---|
| 2,624,156 | 1/1953 | Meyer, Jr. | 46/175 R |
| 2,633,097 | 3/1953 | Frew | 46/175 R |
| 3,765,123 | 10/1973 | Terzian | 46/172 |
| 3,782,030 | 1/1974 | Gergovich | 46/175 R |

*Primary Examiner*—M. Henson Wood, Jr.
*Assistant Examiner*—Victor N. Sakran
*Attorney, Agent, or Firm*—Wallenstein, Spangenberg, Hattis & Strampel

[57] ABSTRACT

A device for attachment to the end of the shaft which extends through the axle of a bicycle wheel. The device has a spoke-engaging portion which successively makes contact with the spokes of the bicycle wheel as it revolves thereby creating a noise while at the same time imparting an animated-like action to the device.

5 Claims, 8 Drawing Figures

PATENTED AUG 6 1974 3,827,178

DEVICE FOR ATTACHMENT TO THE WHEEL OF A BICYCLE

The present invention relates to a device which, in cooperation with the spokes of a bicycle wheel, creates a noise as the wheel revolves.

Various noise making devices for attachment to bicycles have, heretofore, been developed. Generally speaking, these prior devices are characterized by either their comparatively elaborate construction, or the relatively complex attaching means employed to properly position the device on a bicycle, or both. These characteristics of prior noise making devices carry with them certain disadvantages, not only from an economic standpoint in that they represent higher manufacturing costs, but, also, from the standpoint of the ultimate user, usually a small child, who does not, in most instances, have the mechanical skills required to properly attach the device to a bicycle. Prior devices are further characterized in that they generally are designed for the sole purpose of making noise, other factors, such as movement or animation, being accorded little, if any, consideration.

In accordance the present invention, a device for attachment to the wheel of a bicycle is provided which, while primarily functioning as a noise maker, also is vibrated or animated by the wheel spokes as they successively make contact with a portion of the device. The device can be quickly and easily mounted on the wheel of a bicycle by even a small child. The device, furthermore, is simple in construction, and can be manufactured at minimal cost in any shape desired from standard sheet stock.

The device, in brief, comprises a body portion and a resilient spoke-engaging extension or tail portion. The body portion is provided with one or more slits to enable the threaded end of the shaft which extends through the axle of a bicycle wheel to pass transversely through it. Insertion of the end of the shaft through the body portion causes resilient shaft-engaging flaps or ears formed by the slit, or slits to flex outwardly into snug frictional engagement with the threaded shaft. The spoke-engaging extension or tail portion is joined to the body portion, and is adapted to lie in a plane substantially transverse to the plane of the body portion whereby it can be successively contacted by the spokes of the wheel as the wheel turns. The device advantageously is mounted on the wheel in a manner such that the spoke-engaging extension is positioned below the lower edge of a bicycle wheel fender brace, one end of which is normally secured on the shaft of the wheel axle. While rotational movement of the body portion is impeded by the fender brace, the resilient character of the spoke-engaging extension of the device, coupled with the action of the spokes on said extension as the wheel turns, sets up a rapid, though slight, pivoting movement, first in one direction and then in the opposite direction, of the device about the fixed axis provided by the shaft of the wheel axle. This rapid movement imparts a vibratory or animated-like effect which adds to the amusement and pleasure of the user of the device. The device, as indicated, can be made in any shape desired, animal, airplane, or rocket configurations being preferred since they have the greatest appeal to the average youngster.

The foregoing features and advantages of the invention will become more apparent when considered in conjunction with the description to follow and the drawings wherein.

Figure 1:
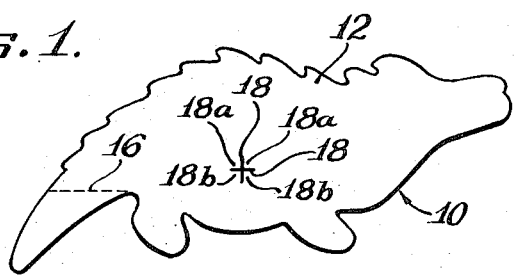
FIG. 1 is a side view in elevation showing an embodiment of the device of the present invention.

Referring, now, in greater detail to the drawings, the embodiment of the device 10 shown in FIG. 1 is in the form of an alligator-like animal, and comprises a body portion 12 and a spoke-engaging extension or tail portion 14. The device 10 may be formed of any resilient material such as paperboard, cardboard, plastic, metal, or the like, and may be die-cut from sheets of such materials utilizing standard die-cutting equipment. The device 10 also can comprise a part of a rectangular card (not shown), the device 10 being outlined by perforations in the card to enable easy separation of the device 10 from the card when it is desired to mount the device on a bicycle wheel. By utilizing a card arrangement as described, suitable instructions for mounting, and for assembling, the device can be printed on the card. The use of a card arrangement for the device, furthermore, simplifies manufacture, as well as handling of the device during shipment and packaging.

At the juncture of the body portion 12 with the spoke-engaging extension or tail portion 14 of the device 10, a crease or fold line 16 desirably is provided to facilitate bending of the tail portion 14 at an angle which will bring the portion 14 into contact with the spokes of a bicycle wheel when the device is mounted thereon.

Figure 5:
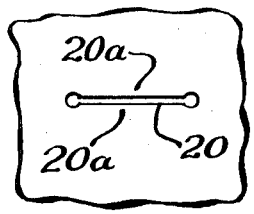
FIG. 5 is a fragmentary view showing a section of the body portion of the device with a single slit formed therein.

The body portion 12, as shown in FIGS. 1 and 5, has one, or more, slits therethrough. The slits 18—18 formed in the embodiment of the device illustrated in FIG. 1 intersect one another at approximately a right angle and are positioned at, or proximal to, the center of gravity of the device. The slits 18—18 form two pairs of resilient shaft-engaging flaps or ears 18a—18a and 18b—18b, the function of which will be made clear hereafter. The single slit 20, formed in the body portion as shown in FIG. 5 may be positioned along the longitudinal axis of the device, or approximately parallel to it, or the slit may be formed transverse to the longitudinal axis of the device. The slit 20 forms a pair of resilient shaft-engaging flaps or ears 20a—20a, the function of which will also become clear as the description proceeds.

Figure 2:
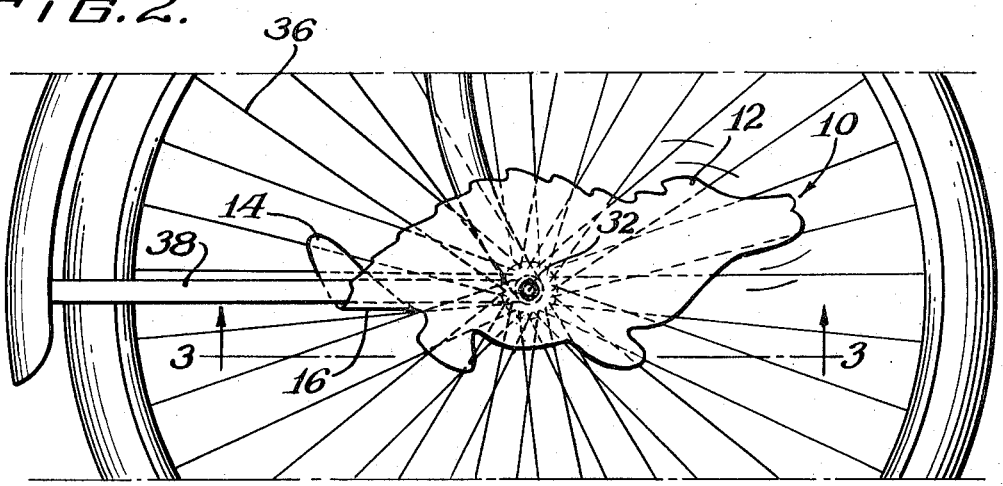
FIG. 2 is a fragmentary side view in elevation showing said embodiment mounted on a bicycle wheel.
Figure 3:
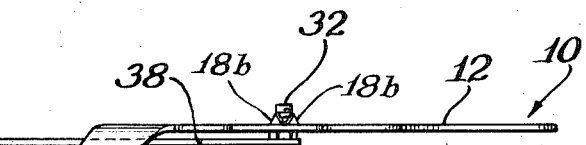
FIG. 3 is a fragmentary bottom plan view as viewed along line 3—3 of FIG. 2.
Figure 4:
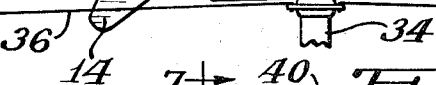
FIG. 4 is a fragmentary side view in elevation showing the relationship of the flaps or ears, formed by the slits in the body portion of the device, to the shaft of the wheel axle.
Figure 4:
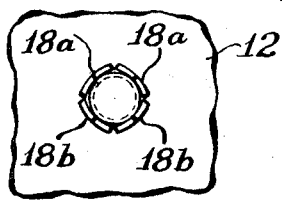

As best seen in FIGS. 2, 3 and 4, the device 10 is mounted on a bicycle wheel, designated by reference numeral 50, by simply aligning the slits 18—18 with the end 32 of the shaft which extends through the axle 34 of the wheel 50, and using only sufficient force to cause the shaft end 32 to pass transversely through the body portion 12. As the end 32 passes through the body portion, the shaft-engaging flaps or ears 18a—18a and 18b—18b are caused to extend outwardly and downwardly from the body portion into snug frictional engagement with the shaft end. The device is thus securely maintained on the wheel.

The tail portion 14, which may be bent along crease or fold line 16 in the direction of the spokes 36 of the wheel 50 either before, or after, the body portion 12 is mounted on the shaft end, is then positioned so that the lower edge of the fender brace 38 will make contact with the tail portion 14 as the wheel 30 turns. By thus positioning the tail portion 14, the device 10 is, at all times, properly oriented on the wheel. As the wheel turns, the portion 14 makes contact with the spokes thereby creating a clicking or snapping noise. At the same time, the rapid, successive contacts between the tail portion 14 and the spokes impart to the device 10 a vibratory, animated-like action. Thus, a child-pleasing noise, together with a life-like motion, are provided by a single, simply constructed device.

Figure 6:
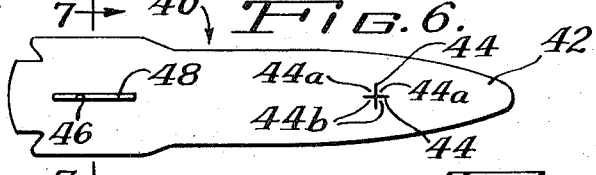
FIG. 6 is a side view in elevation of another embodiment of the device of this invention.
Figure 7:
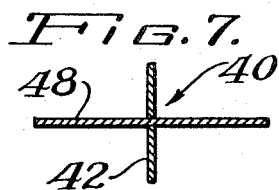
FIG. 7 is a sectional view taken substantially along line 7—7 of FIG. 6.
Figure 8:
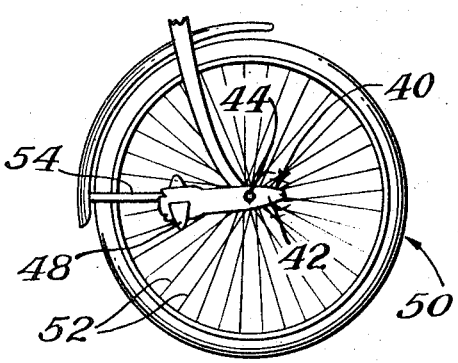
FIG. 8 is a side view in elevation showing the embodiment illustrated in FIG. 6 mounted on a bicycle wheel.

In the embodiment of the invention illustrated in FIGS. 6, 7 and 8 of the drawing, the device 40, as shown, has the configuration of a rocket. The body portion 42 of the device 40, like the body portion 12 of the device 10, has two intersecting slits 44—44 formed therein to enable the end of the shaft which extends through the axle of the bicycle wheel to pass transversely through the body portion 42. The slits 44—44, also as in the case of the slits 18—18 of the device 10, form two pairs 44a—44a and 44b—44b of shaft-engaging ears or flaps. The body portion 42 is further provided with a slot 46 therethrough for receiving a tail member 48. The member 48 has a length such that when the device 40 is mounted on a bicycle wheel 50 as shown in FIG. 8, one end of the member 48 will make contact with the spokes 52 of the wheel as the wheel turns. The device 40 is mounted on the shaft end of the bicycle wheel axle in the same manner as described above in connection with the device 10, that is, the shaft end protrudes through the slits 44, and the tail member 48 is positioned under the lower edge of the bicycle wheel fender brace 54. Contact between one end of the tail member 48 and the spokes of the bicycle wheel creates a noise, while at the same time imparting a vibratory, realistic-like motion to the device 40.

It should be understood that various modifications may be made in the preferred forms of the invention described herein without departing from the broader aspects of the invention.

What is claimed is:

1. A device for attachment to the wheel of a bicycle comprising a flexible resilient body portion having at least one slit formed therein, said slit serving to enable the end of the shaft which extends through the axle of a bicycle wheel to pass transversely through the body portion and providing at least one pair of resilient shaft-engaging flaps for maintaining the body portion on the shaft after the end of the shaft is passed through the body portion, and a spoke-engaging extension joined to the body portion, said extension being adaped to lie in a plane substantially transverse to plane of the body portion when it is mounted on the end of the axle shaft and to successively engage the spokes of a bicycle wheel as the wheel rotates whereby a sound results and a animated-like movement is imparted to the device.

2. A device according to claim 1 wherein the body portion is positioned on the axle shaft end in a manner to enable the spoke-engaging extension to engage the lower edge of a bicycle wheel fender brace associated with the wheel thereby to maintain the device properly oriented on the wheel and to aid in imparting a vibratory motion to the device as the wheel turns.

3. A device according to claim 1 wherein the body portion is provided with a slot for receiving a separate spoke-engaging extension.

4. A device according to claim 1 wherein the body portion has two intersecting slits formed therein to enable the end of the axle shaft to pass transversely through the body portion.

5. A device according to claim 4 wherein the intersecting slits form cooperating pairs of shaft-engaging flaps for maintaining the device on the end of the axle shaft.

* * * * *